(No Model.)

C. W. LARSEN.
PLOW.

No. 460,020. Patented Sept. 22, 1891.

WITNESSES:
Chas. Nida
C. Sedgwick

INVENTOR
C. W. Larsen
BY Munn & Co.
ATTORNEY.

UNITED STATES PATENT OFFICE.

CARL. W. LARSEN, OF MEDICAL LAKE, WASHINGTON.

PLOW.

SPECIFICATION forming part of Letters Patent No. 460,020, dated September 22, 1891.

Application filed May 28, 1891. Serial No. 394,395. (No model.)

*To all whom it may concern:*

Be it known that I, CARL. WILLIAM LARSEN, of Medical Lake, in the county of Spokane and State of Washington, have invented a new and useful Improvement in Plows, of which the following is a full, clear, and exact description.

My invention relates to an improvement in plows, and has for its object to provide a plow with an attachment whereby the plow may be effectively used in working ground where roots, stones, and other obstacles are numerous; and a further object of the invention is to so construct the attachment that it may be readily carried out of the way when the plow is used as a stubble-plow and to provide an attachment of the character above described which will be of simple, durable, and economic construction.

The invention consists in the novel construction and combination of the several parts, as will be hereinafter fully described, and set forth in the claims.

Reference is to be had to the accompanying drawings, forming a part of this specification, in which similar figures of reference indicate corresponding parts in both the views.

Figure 1:
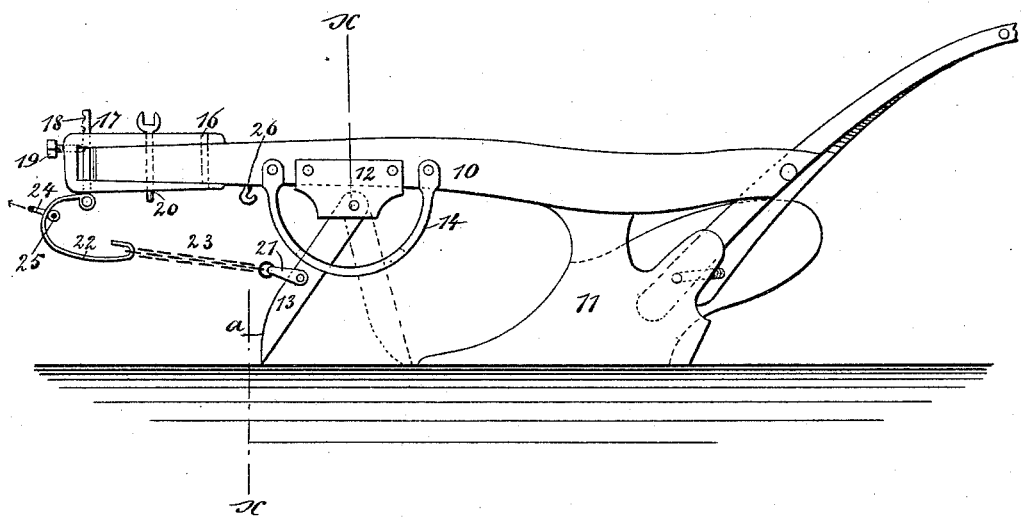
Figure 2:
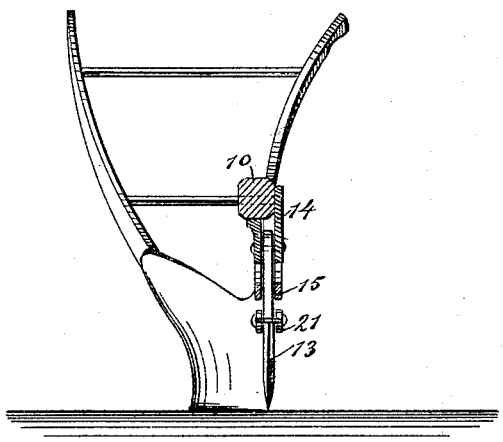

Figure 1 is a side elevation of the plow, and Fig. 2 is a section taken practically on the line *x x* of Fig. 1.

On the under side of the plow-beam 10, in front of the share 11, a socket 12 is formed or fixed, and in said socket the upper end of a knife 13 is pivoted, the forward edge of the said knife at its lower end being preferably curved downward, as illustrated at *a* in Fig. 1. The socket 12 is contained within a guard 14, which guard is also secured to the under face of the plow-beam, and the guard is provided with a slot 15, through which the knife 13 extends and in which said knife has lateral movement, the movement of the knife being limited by the length of the slot.

A clip-casting 16 is secured upon the forward end of the plow-beam, and in the clip-casting a rod or bar 17 is capable of vertical movement, the said rod or bar being provided at its lower end, which extends below the clip-casting, with an eye, and in the upper portion of the front face of the bar or rod a series of grooves or notches 18 is produced, and the rod or bar 17 is held in a fixed position through the medium of a set-screw 19, which passes through the forward end of the clip-casting into one of the grooves or notches of the rod or bar 17. The bar or rod is adapted for regulating the depth at which the share is to travel in the ground, and likewise the knife 13. Therefore it is vertically adjustable, and the set-screw 19 is preferably provided with a polygonal head adapted to be turned by a wrench; and that a tool may be at hand with which to manipulate the set-screw a pin 20 is removably inserted in an opening in the clip and the plow-beam, as shown in Fig. 1, the upper end of which pin is formed as a wrench and is adapted to receive the head of the set-screw.

A clevis 21 is pivotally attached to the knife 13 below the guard 14, and ordinarily a rearwardly-curved spring-plate 22 is attached to the adjusting rod or bar 17, being thus attached by passing a pin through the upper end of the spring-plate and through the eye of the bar. The rear end of the spring-plate is formed as a hook, and is connected with the clevis 21 of the knife by a chain 23 of suitable length. A clevis 24 is carried by the spring-plate 22, and the portion of the clevis bearing against the spring-plate is preferably provided with a friction-roller 25. The clevis 24, when the spring-plate is used, is adapted for use as a draft-clevis.

It will be readily observed that when the plow is drawn forward and the knife is connected with the spring-plate 22 the knife will be held in a forwardly-inclined position and will cut roots and move obstructions from the path of the share in advance of the latter.

In the event that the knife should meet with an obstruction too solid to be cut or be removed from the path of the plowshare the knife will draw back against the tension of the spring-plate until its lower end intersects with the point of the share, as shown in dotted lines in Fig. 1, which action will cause the share to slide over the obstruction and again enter the ground, the knife at that time returning to its normal position.

If the plow is to be used as a stubble-plow, the chain is disengaged from the spring-plate 22 and is fastened to a hook 26, located beneath the plow-beam, whereby the knife is held upward out of the way. When the plow is used as a stubble-plow, the spring-plate 22 is removed, and when the knife is held upward beneath the beam the roller 25 is removed from the clevis 24 and the clevis is connected with the lower end of the adjusting rod or bar.

Having thus described my invention, I claim as new and desire to secure by Letters Patent—

1. The combination, with a plow-beam, a knife pivoted to the beam and extending downwardly therefrom in alignment with the share of the plow, and a guard surrounding the pivot of the knife and provided with a slot for the passage thereof, of an adjusting-bar located in front of the plow-beam, a spring-plate, rearwardly curved, attached to the adjusting-bar and adapted for the reception of a clevis, and a chain connection between the spring-plate and the knife, substantially as shown and described.

2. The combination, with a plow-beam, a knife pivoted at one end beneath the beam, extending downwardly therefrom and provided with a curved lower cutting-edge, and a guard surrounding the pivot-point of the knife and slotted to admit of the passage of the latter, of a bar located in front of the plow-beam and adapted for vertical movement, a set-screw engaging with the bar, a spring-plate rearwardly curved and removably attached to the adjusting-bar, a draft-clevis carried by the spring-plate, a clevis attached to the knife, and a chain connection between the knife-clevis and the spring-plate, as and for the purpose specified.

3. The combination, with a plow-beam, a knife pivoted at its upper end beneath the plow-beam and extending downwardly therefrom, its forward edge being the cutting-edge, and a guard surrounding the pivot-point of the knife and having a slot produced therein through which the knife passes, of an adjusting-bar adapted to regulate the depth at which the plowshare travels, a set-screw engaging with the bar, a wrench loosely mounted in the beam and adapted for manipulating the set-screw, a rearwardly-curved spring-plate removably attached to the lower end of the adjusting-bar, a draft-clevis carried by the said plate, a clevis attached to the knife below the guard, and a connection between the knife-clevis and spring-plate, as and for the purpose set forth.

CARL. W. LARSEN.

Witnesses:
J. M. LANDIS,
H. MARR.